United States Patent
Karnik (10) Patent No.: US 7,715,835 B1
(45) Date of Patent: May 11, 2010

(54) METHOD AND APPARATUS FOR ADMINISTERING MOBILE CLIENT DEVICES ACROSS LOCATIONS

(75) Inventor: Neeran Karnik, Pune (IN)

(73) Assignee: Symantec Corporation, Mountain View, CA (US)

( * ) Notice: Subject to any disclaimer, the term of this patent is extended or adjusted under 35 U.S.C. 154(b) by 626 days.

(21) Appl. No.: 11/728,616

(22) Filed: Mar. 27, 2007

(51) Int. Cl.
*H04M 3/00* (2006.01)

(52) U.S. Cl. .................. 455/420; 455/418; 455/419; 455/423; 455/424; 455/425; 455/41.1; 455/41.2; 455/414.1; 455/414.3; 455/456.1; 455/456.5; 340/539.1; 340/539.11; 340/539.13; 340/539.23; 340/572.1

(58) Field of Classification Search ......... 455/418–420, 455/423–425, 456.1–456.6, 41.1–41.2, 550.1, 455/561, 414.1–414.3; 340/539.1, 539.11–539.13, 340/539.22–539.23, 572.1
See application file for complete search history.

(56) References Cited

U.S. PATENT DOCUMENTS

| | | | |
|---|---|---|---|
| 6,697,644 B2 * | 2/2004 | Scherzer et al. .......... 455/562.1 |
| 6,990,335 B1 * | 1/2006 | Shamoon et al. ............ 455/419 |
| 7,171,187 B2 * | 1/2007 | Haave et al. ............. 455/404.2 |
| 7,286,814 B2 * | 10/2007 | Watanabe et al. ......... 455/404.2 |
| 7,634,299 B2 * | 12/2009 | Mise et al. .................. 455/567 |
| 2005/0170828 A1 * | 8/2005 | Nakamura et al. .......... 455/419 |
| 2006/0099967 A1 * | 5/2006 | Colvin et al. ............ 455/456.4 |

* cited by examiner

*Primary Examiner*—Tuan A Tran
(74) *Attorney, Agent, or Firm*—Moser IP Law Group (57) ABSTRACT

A method of administering a mobile client device is provided. In an example, notice is received of a device being physically present at a location of interest, an executable work flow or script for implementing a corresponding change to the device is prepared in response to the physical presence notice, and the executable work flow or script is transmitted to the device upon an occurrence of the device initiating a communication with a network so as to enable an agent resident on the device to implement the corresponding change. In an example, a device detector remotely receives a response signal from a vicinity of the device, the response signal being generated and transmitted in response to a corresponding interrogation signal. In an example, the interrogation signal is an RFID interrogation signal.

19 Claims, 6 Drawing Sheets

METHOD AND APPARATUS FOR ADMINISTERING MOBILE CLIENT DEVICES ACROSS LOCATIONS

BACKGROUND OF THE INVENTION

1. Field of the Invention

The present invention generally relates to computer networks and, more particularly, to methods and apparatus for administering mobile client devices across locations.

2. Description of the Background Art

Modern businesses employ thousands of employees, many of which may be obliged to travel on a regular or semi-regular basis between and among different company offices or other company business locations. Like many other employees, such "mobile employees" are usually equipped by their respective companies with one or more mobile devices, such as PDAs, mobile phones, laptops, or other computer-related devices. Each mobile device is usually commissioned as a company asset by an information technology (IT) department representative of the respective company before being assigned to the particular employee. Unlike most other employees, however, mobile employees cannot necessarily take for granted that such devices will function smoothly and/or properly each time they operate them at a new or different office or business location. At least one reason for this is that a device that has been made to comply with applicable local standards for operation at one location will often, upon migrating to another location, be found to be deficient with respect to different applicable local standards for making the same connection. For example, upon migrating from one location to another, a set of changes to the device having to do with one or more of the device's configuration settings, such as a time zone setting, various network settings, a preferred file and backup server setting, etc., may be required. Also, or in the alternative, one or more other actions with respect to the mobile device, such as enabling or disabling particular applications resident on the device, or adding/downloading or removing/offloading one or more tools, utilities, data files, etc., may be required as a result of device migration.

Unfortunately, it is not always particularly easy or straightforward for mobile employees to implement the necessary changes to their devices each and every time they move to a location. IT department representatives are usually available via phone to help such mobile employees to implement such changes, or to implement such changes in person, or via remote operation. Nevertheless, such scenarios can still tend to unfold in ways that are frustrating and inconvenient for the mobile employee, who is usually otherwise ready to begin work but must endure the inevitable delay of reconfiguring their device for correct operation. There is a need, therefore, to address the above-mentioned problems.

SUMMARY OF THE INVENTION

A method of administering a mobile client device is provided. In at least one embodiment, notice is received of a device being physically present at a location of interest, an executable work flow or script for implementing a corresponding change to the device is prepared in response to the physical presence notice, and the executable work flow or script is transmitted to the device upon an occurrence of the device initiating a communication with a network so as to enable an agent resident on the device to implement the corresponding change. In at least one embodiment, a device detector remotely receives a response signal from a vicinity of the device, the response signal being generated and transmitted in response to a corresponding interrogation signal. In at least one embodiment, the interrogation signal is an RFID interrogation signal.

BRIEF DESCRIPTION OF THE DRAWINGS

So that the manner in which the recited features of the present invention can be understood in detail, a more particular description of the invention, briefly summarized below, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Method and apparatus for administering mobile client devices across locations is described. One or more aspects of the invention are described with respect administering mobile client devices (generally referred to as "assets") across physical locations managed by an enterprise (referred to as a "parent enterprise"). It is to be understood, however, that management of the locations by a single parent enterprise, while typical, is not a requirement of the invention. In general, the locations may be managed by one or more entities.

In embodiments of the invention, mobile client devices (e.g., laptops, PDAs, etc.) include electronically detectable tags having unique identifiers ("tag identifiers"). Each of the locations includes a detector for detecting the presence of the tags. In a specific non-limiting embodiment, the tags comprise radio frequency identifier (RFID) tags and the detectors comprise RFID readers. An asset database is provided that correlates the tag identifiers with the respective mobile client devices and includes the last known locations of the devices. A configuration rule database is provided that stores location-based rules that dictate what changes must be applied when particular classes of client devices are operated in particular locations. An administration server is provided to interface with the detectors, the asset database, and the configuration rule database, and to drive the application of changes to the mobile client devices as they migrate across locations.

Figure 1:
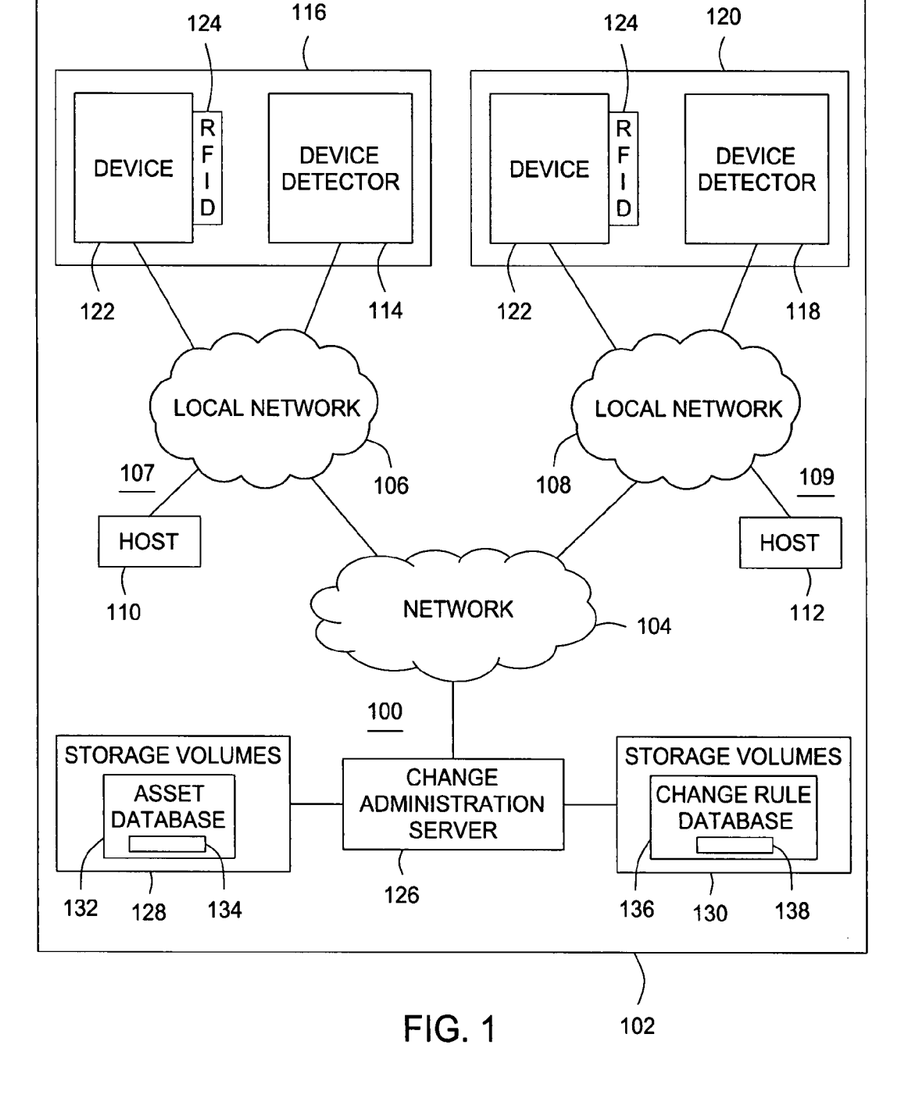
FIG. 1 is a block diagram depicting an exemplary embodiment of a computer network in accordance with one or more aspects of the invention.

FIG. 1 is a block diagram depicting an exemplary embodiment of a computer network 100 in accordance with one or more aspects of the invention. The computer network 100 forms part of a parent enterprise 102, and a network 104 associated with the parent enterprise 102 forms part of the computer network 100 as well, at least insofar as there exist components of the computer network 100 that communicate with each other via the network 104. The network 104 comprises a communication system that connects computer systems by wire, cable, fiber optic, and/or wireless links facilitated by various types of well-known network elements, such as hubs, switches, routers, and the like. The network 104 may employ various well-known protocols to communicate information.

Respective local networks 106, 108 associated with respective domains 107, 109 of the parent enterprise 102 further form part of the computer network 100, at least insofar as there exist components of the computer network 100 that communicate with each other via the respective local networks 106, 108. Each of the local networks 106, 108 comprises a communication system that connects computer systems by wire, cable, fiber optic, and/or wireless links facilitated by various types of well-known network elements, such as hubs, switches, routers, and the like. Each of the local networks 106, 108 may employ various well-known protocols to communicate information.

Respective local hosts 110, 112 associated with the domains 107, 109 of the parent enterprise 102 further optionally form part of the computer network 100, at least insofar as there exist components of the computer network 100 that reside on or form part of the function or structure of the respective local hosts 110, 112, as will be discussed in greater detail hereinafter. The computer network 100 further extends into physical locations associated with, or forming part of, the parent enterprise 102, at least insofar as the computer network 100 includes a device detector 114 located at a first location of interest 116 within the parent enterprise 102, and a device detector 118 located at a second location of interest 120 within the parent enterprise 102. The first and second locations of interest 116, 120 correspond respectively to the domains 107, 109, and so may be considered to respectively 'map' to the domains 107, 109 for purposes of correlating enterprise locations of interest to enterprise domains, and other purposes as discussed more fully below.

Each of the device detectors 114, 118 generates and transmits a detection signal in response to an enterprise asset in the form of a mobile client device 122 (described more fully below) appearing within a sufficiently close proximity to the device detector 114, 118 to permit the device detector 114, 118 to directly detect the device 122. In the present example, each of the device detectors 114, 118 is an RFID reader that transmits an RFID interrogation signal. The device 122 includes an RFID transponder 124 configured to transmit a response to the RFID interrogation signal. The response includes a unique identifier associated with the device 122. The detectors 114, 118 remotely detect the device 122 by receiving the response signal from the RFID transponder 124. In another example, one or both of the device detectors 114, 118 is a bar code reader for reading a corresponding bar code tag affixed to the device 122 in place of the RFID transponder 124. Still other types of detectors 114, 118 are possible.

The computer network 100 further includes a change administration server 126. The change administration server 126 is coupled to the device detectors 114, 118 via the network 104 and the respective local networks 106, 108. The change administration server 126 is configured to receive the above-discussed detection signals from the device detectors 114, 118. The change administration server 126 further hosts a change administration service for enterprise assets, such as the device 122. The change administration service allows the device 122 to selectively connect to the parent enterprise 102 at either of the first and second locations of interest 116, 120. The change administration server 126 is configured to manage one or more storage volumes 128 and one or more storage volumes 130. Each of the one or more storage volumes 128 and the one or more storage volumes 130 may comprise any type of block-backed storage areas and may be implemented using any type of storage system or storage systems, such as a disk drive system. A disk drive system may include, for example, one or more storage disks, e.g., an array of storage disks or a redundant array of storage disks.

The storage volumes 128 store an asset database 132 for storing current information with regard to commissioned enterprise assets in the form of devices, such as the device 122, capable of connecting to the parent enterprise 102 at the first and second locations of interest 116, 120. Such current information with regard to such devices is lodged in the asset database 132 in the form of a plurality of database entries 134, each of which contains information about a particular one of such devices. The change administration server 126 is configured to query the asset database 132 with device identifiers to obtain information corresponding to the devices. The change administration server 126 can similarly update the asset database 132 to cause corresponding database asset entries 134 of the asset database 132 to reflect new information relating to particular devices, as will be described in greater detail hereinafter.

The storage volumes 130 store a change rule database 136 for storing current rule information with regard to changes to enterprise devices required to operate across different locations, including both of the first location of interest 116 and the second location of interest 120. Such rule information is lodged in the change rule database 136 in the form of a plurality of rule entries 138, each of which rule entries 138 contains information about a particular rule for implementing a change to an affected device. The structure and function of the change rule database 136, and of the rule entries 138 contained in the change rule database 136, will be described in greater detail hereinafter. In accordance with one or more aspects of the invention, the change administration server 126 initiates and administers changes to devices connecting to the parent enterprise 102 at the different locations of interest, as described below.

Figure 2:
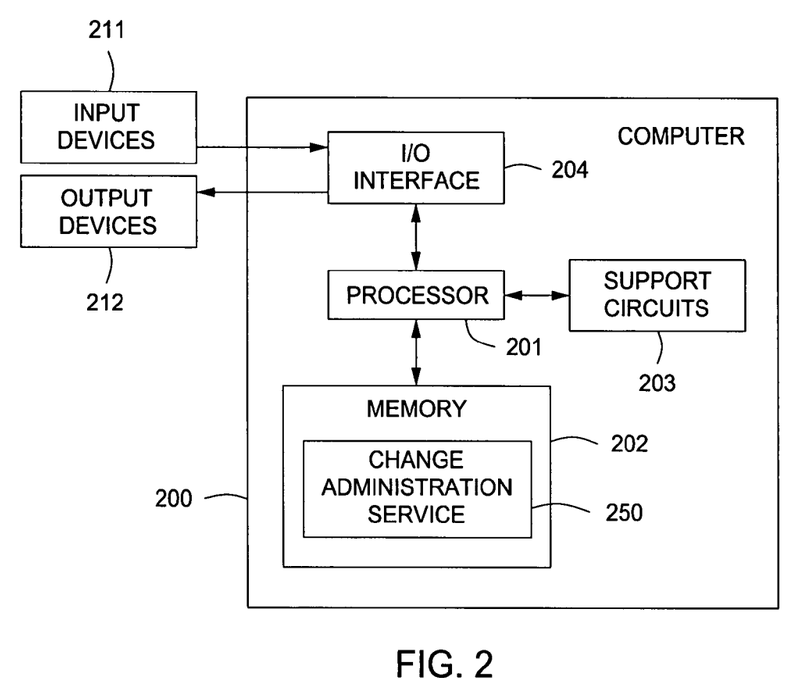
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 may be used to implement the change administration server 126 in FIG. 1. The computer system 200 includes a processor 201, a memory 202, various support circuits 203, and an I/O interface 204. The processor 201 may include one or more microprocessors known in the art. The support circuits 203 for the processor 201 include conventional cache, power supplies, clock circuits, data registers, I/O interfaces, and the like. The I/O interface 204 may be directly coupled to the memory 202 or coupled through the processor 201. The I/O interface 202 may also be configured for communication with a network, with various storage devices, as well as other types of input 211 and output devices 212 (e.g., mouse, keyboard, display, etc.). The memory 202 stores processor-executable instructions and/or data that may be executed by and/or used by the processor 201. These processor-executable instructions may comprise hardware, firmware, software, and the like, or some combination thereof.

Modules having processor-executable instructions that are stored in the memory 203 may include a change administration service 250. The change administration service 250 is configured to execute a change administration process, as described below. The computer system 200 may be programmed with an operating system, which may be OS/2, Java Virtual Machine, Linux, Solaris, Unix, Windows, Windows95, Windows98, Windows NT, Windows2000, WindowsME, WindowsXP, and Windows Server, among other known platforms. At least a portion of an operating system may be disposed in the memory 202. The memory 202 may include one or more of the following: random access memory, read only memory, magneto-resistive read/write memory, optical read/write memory, cache memory, magnetic read/write memory, and the like, as well as signal-bearing media as described below.

Figure 3:
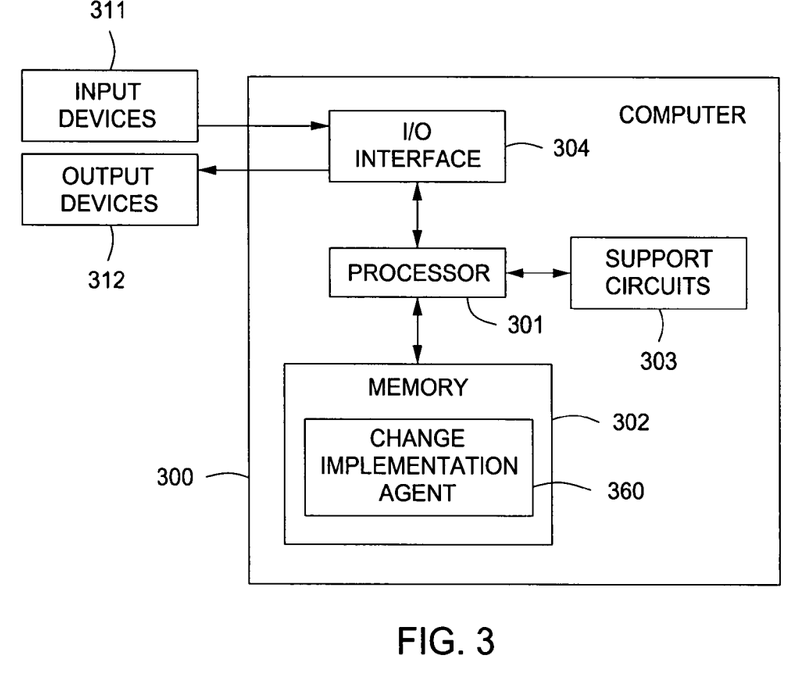
FIG. 3 is a block diagram depicting an exemplary embodiment of another computer system in accordance with one or more aspects of the invention.

FIG. 3 is a block diagram depicting an exemplary embodiment of a computer system 300 in accordance with one or more aspects of the invention. The computer system 300 may be used to implement the device 122 in FIG. 1. The computer system 300 includes a processor 301, a memory 302, various support circuits 303, and an I/O interface 304. The processor 301 may include one or more microprocessors known in the art. The support circuits 303 for the processor 301 include conventional cache, power supplies, clock circuits, data registers, I/O interfaces, and the like. The I/O interface 304 may be directly coupled to the memory 302 or coupled through the processor 301. The I/O interface 302 may also be configured for communication with a network, with various storage devices, as well as other types of input 311 and output devices 312 (e.g., mouse, keyboard, display, etc.). The memory 302 stores processor-executable instructions and/or data that may be executed by and/or used by the processor 301. These processor-executable instructions may comprise hardware, firmware, software, and the like, or some combination thereof.

Modules having processor-executable instructions that are stored in the memory 303 may include a change implementation agent 360. The change implementation agent 360 is configured to execute a work flow or script importation and execution process, as described below. The computer system 300 may be programmed with an operating system, which may be OS/2, Java Virtual Machine, Linux, Solaris, Unix, Windows, Windows95, Windows98, Windows NT, Windows2000, WindowsME, WindowsXP, and Windows Server, among other known platforms. At least a portion of an operating system may be disposed in the memory 302. The memory 302 may include one or more of the following: random access memory, read only memory, magneto-resistive read/write memory, optical read/write memory, cache memory, magnetic read/write memory, and the like, as well as signal-bearing media as described below.

Figure 4:
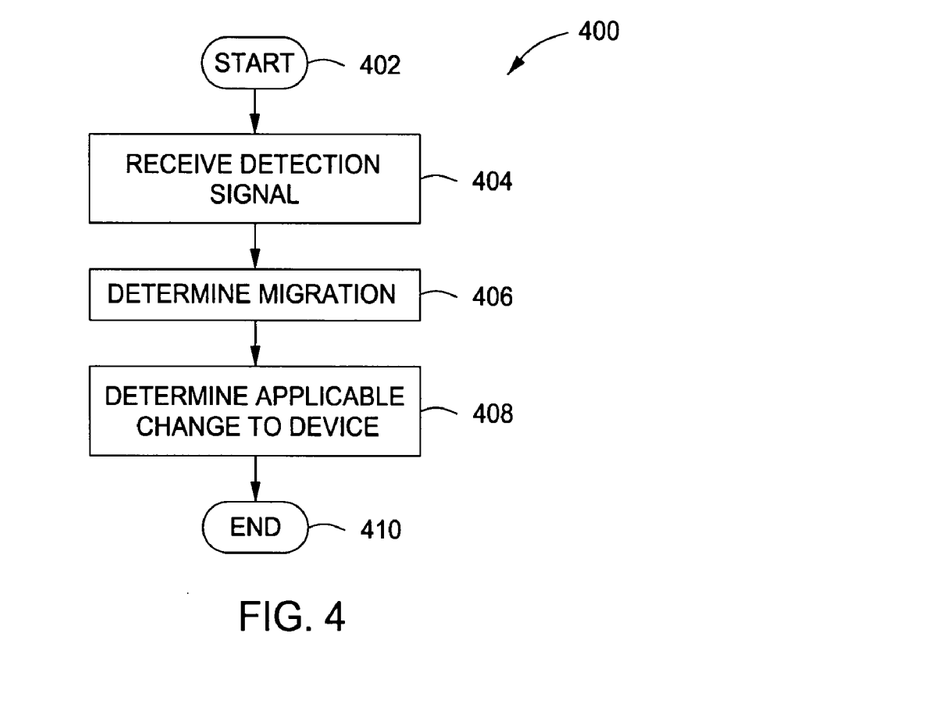
FIG. 4 is a flow diagram depicting an exemplary embodiment of a method for determining necessary changes to the configuration settings of enterprise devices in accordance with one or more aspects of the invention.

FIG. 4 is a flow diagram depicting an exemplary embodiment of a method 400 for determining necessary changes to the configuration settings of enterprise devices in accordance with one or more aspects of the invention. The method 400 may be performed by the change administration service 250 of FIG. 2 and the change administration server 126 of FIG. 1 to determine such changes with respect to such devices as the device 122 of FIG. 1, as the device 122 moves between locations, such as the locations of interest 116 and 120. As discussed more fully below, the method 400 may be used and/or altered to administer changes to enterprise devices other than, or in addition to, the configuration settings thereof.

The method 400 begins at a step 402. At step 404, a detection signal, transmitted by a detection device 114, 116 is received. The detection signal is generated by the detection device 114, 116 upon remotely detecting the presence of the RFID transponder 124 associated with the device 122 at a respective location of interest 116, 120. In some embodiments, such detection signal is passed to the change administration server 126 via the respective local network 106, 108 and the network 104. The detection signal includes a location of interest identification information with which the respective location of interest 116, 120 is associated, and a device identification information with which the device 122 is uniquely associated. In some embodiments, the detection device 114, 116 is located at a fixed location at or near an entrance to the location of interest 116, 120. The device 122 may be detected upon passing through such entrance and thereby approaching within a close enough proximity to the detection device 114, 116 to permit an RFID interrogation signal from the detection device 114 to reach the RFID transponder 124, and to permit a response signal from the RFID transponder 124 to reach the detection device 114, 116. In some embodiments, the detection device 114, 116 is moveable to permit the detection device 114, 116 to be moved to within such close enough proximity. In some embodiments, the RFID transponder 124 is affixed to an outer shell or surface of the device 122, and in other embodiments the RFID transponder 124 is contained within the device 122. In some alternative embodiments, such detection signal is passed to the change administration server 126 via a transmission path other than via the respective local network 106, 108 and the network 104. For example, such transmission path can be a dedicated one- or two-way communications network that is kept separate from the network 104 for security purposes.

Proceeding to a step 406, a migration determination is performed. More particularly, in step 406, the location of interest identification information and the device identification information derived from the detection signal is compared to existing information regarding the last location of interest within the parent enterprise 102 at which the device 122 was present. In this manner, it is determined whether the device 122 has moved from one location to another. For example, the asset database 132 can be consulted with a location of interest identification information with which the particular location of interest 116, 120 is associated and a device identification information with which the device 122 is uniquely associated, as described more fully hereinafter with reference to the related flow diagram illustrated in FIG. 6.

In the event it is determined that the device 122 has migrated with respect to the last location of interest within the parent enterprise 102 at which the device 122 was present, the method 400 proceeds to a step 408. At step 408, an applicable change to the configuration settings of the device 122 is determined by which device 122 can be made to conform with applicable local standards for connecting to the parent enterprise 102 at the particular location of interest 116, 120. For example, the change rule database 136 can be consulted with a location of interest identification information with which the particular location of interest 116, 120 is associated and an asset class identification information with which the device 122 is associated, as described more fully hereinafter with reference to the related flow diagram illustrated in FIG. 5. Once the applicable change to the device is determined, the method ends at a step 410. Thereafter, the applicable change can be implemented in accordance with other methods described below. For example, in the event the device 122 is already connected to the parent enterprise 102 at the particular location of interest 116, 120, the applicable change can be implemented immediately. Alternatively, the applicable change can be kept in abeyance until a later time or until after a delay, e.g., upon the next attempt by the device 122 to connect to the parent enterprise 102 at the particular location of interest 116, 120.

The above-described method 400 and computer network 100 provide many useful features and advantages. For example, the above-described method 400 and computer network 100 can be used to determine the necessary change to the configuration settings of the device 122 well in advance of the device 122 logging on to the parent enterprise 102 for the first time at a new business location. As will be explained further below with reference to the respective flow diagrams of FIGS. 7 and 8, in at least some embodiments, this permits the mobile employee to trigger an automatic implementation of the predetermined change simply by using the device 122 to connect to the parent enterprise 102 at the new location.

In some embodiments, the present invention utilizes RFID technology to facilitate notification of enterprise assets arriving at or being present at locations of interest within the parent enterprise 102. One reason RFID technology is already in wide use in this regard is the relative ease with which an enterprise may track the movement of its commissioned digital or computer-related assets by the use of RFID tags and associated RFID readers. The method 400 leverages the convenience, inherent reliability, and fool-proof "automaticity" of RFID technology to provide a background-operable engine for aligning the configuration settings of mobile enterprise assets with domain-specific enterprise connection requirements as they move from place to place within a business enterprise. Largely relieved of the need to attend to such concerns, mobile employees and IT department personnel alike are permitted to focus on the higher-level functions of their jobs more closely tied to their respective companies' goals and/or core competencies.

The method 400 is susceptible to many useful variations and modifications. Information regarding a physical presence of the device 122 at the location of interest 116, 120 can be obtained in one or more ways other than via receiving a related detection signal. For example, such information can be passed to the change administration server 126 by means other than an actual detection signal (e.g., other than a detection signal generated and transmitted by the device detector 114, 118), such as verbally, and/or via a corresponding online or telephonic notification process undertaken by the mobile employee to which the device 122 is assigned.

The change administration server 126, the change administration service 250, the asset database 132, and the change rule database 136 associated with the computer system 100 are described above and with respect to the present method 400 as being centrally located with respect to the various locations of interest within the parent enterprise 102. However, at least one or more of the structures and functions associated with such components can be implemented by a distributed collection of appliances (e.g., local backend servers) and/or related modules located at or near the respective locations of interest within the parent enterprise 102, and/or forming part of the local domains (e.g., domains 107 and 109) with or to which such locations of interest are associated or "mapped". For example, the structure and function of the change administration server 126 can be implemented by either or both of the respective local hosts 110, 112, at least insofar as the change administration service 250 can be located on and/or function through such local hosts 110, 112. In some embodiments, one or both of the domains 107 contain respective storage volumes or equivalent equipment, on which are provided distributed copies of the asset database 132 and the change rule database 136, updated as necessary from one or more centrally-located or centrally-maintained repositories of related information. Also, in some embodiments, each domain hosts a self-contained version of the computer system 100 for administering configuration setting changes to any and all locally-appearing devices, whether or not such devices are new to the domain (e.g., there being no need for an asset database to determine the fact of device migration). Such determined changes to the configuration settings of devices could be based on asset class information, and not necessarily on the unique identification information of a particular device, and could be restricted to idempotent changes, changes of only local significance, and/or suggested or optional changes that the user may or may not elect to authorize.

The present method 400 and/or the computer network 100 are further modifiable for purposes of determining migration-triggered changes to mobile client devices, such as the device 122, other than solely to the configuration settings thereof. Such other changes may include adding to the device 122, and/or removing from the device 122, one or more software tools, utilities (such as a locally-tailored virus detection and cleaning utility), data files, and/or other data- or content-related objects or items (e.g., objects or items containing data that is or may be considered responsive to a litigation discovery request).

Figure 5:
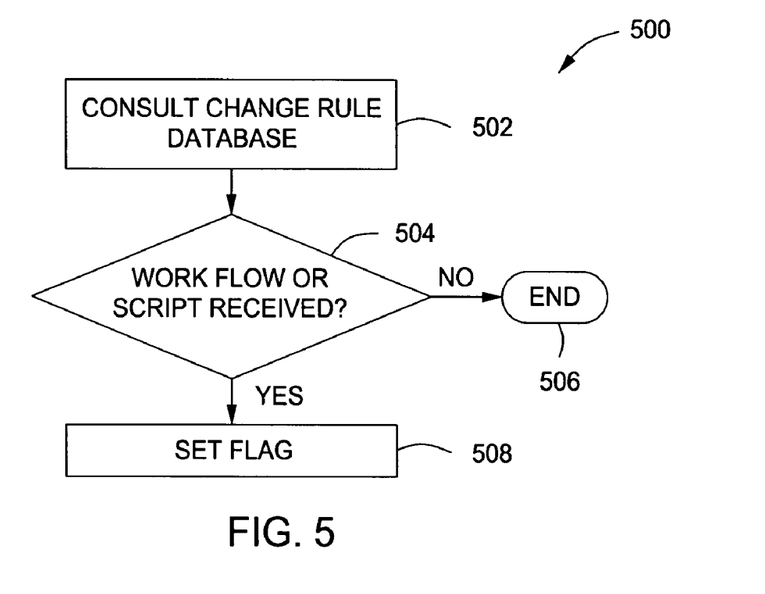
FIG. 5 is a flow diagram depicting an exemplary embodiment of a method for implementing an applicable change determination step shown and described with reference to FIG. 4 in accordance with one or more aspects of the invention.

FIG. 5 is a flow diagram depicting a method 500 for implementing the applicable change determination step 408 shown and described herein with respect to FIG. 4 in accordance with one or more aspects of the invention. Accordingly, the method 500 may be performed by the change administration service 250 of FIG. 2 and the change administration server 126 of FIG. 1. The method 500 begins at a step 502 at which the change rule database 136 is consulted using the location of interest identification information with which the particular location of interest 116, 120 is associated, and the asset class information with which the device 122 is associated. Related rule base entries 138 of the change rule database 136 can have the following format: "when <asset-class> enters <location of interest> apply <action>", wherein the <action> parameter specifies one or more actions that are required to be executed whenever a device associated with the specified asset class is powered up or activated in the specified location of interest for the first time (e.g., after having moved from another location having different rules or standards with respect to device configuration settings). For example, the <action> parameter can specify an executable work flow or script corresponding to the required change. At a step 504, the results of the rule base consultation of the step 502 are evaluated. If no work flow or script was returned as a result of such rule database consultation, the method 500 ends at a step 506. If a work flow or script was returned as a result of such rule database consultation, the method 500 proceeds to a step 508. At step 508, a flag or some such other similar indicia is set within the parent enterprise 102, e.g., within the change administration server 126. Such a flag is set to signify that a change to the configuration settings of the device 122 has been determined, and that implementation of such change is required to harmonize the configuration settings of the device 122 with such local standards as apply within the respective location of interest 116, 120. As used herein, the terms "work flow or script" and "executable work flow or script" refer to a machine-executable set of instructions for accomplishing a given function. So set, the flag is designed and configured to be accessible by the change implementation agent 360 resident on the computer system 300, e.g., via the change implementation agent 360 querying the change administration service 250 as to the existence or non-existence of such a flag, as described more fully below.

The method 500 is susceptible to many useful variations and/or modifications. Among the actions potentially specified by the change rule database 136 are work flows or scripts executable to change one or more of the following: a time zone setting, a hypertext transfer protocol (HTTP) proxy server setting, a dynamic host configuration protocol (DHCP) setting, a security/VPN (virtual private network) setting, and a preferred file and backup server setting. Also, one or more of the rule database entries 138 may have a format different in one or more respects from the format "when <asset-class> enters <location of interest> apply <action>." For example, such rule database entries 138 can have one of the following alternative formats: "when <asset-class> exits <location of interest> apply <action>" (e.g., used for security purposes to disable an application or remove a tool or utility (such as the use of an outbound modem) only used or permitted to be used in the location of interest that has been exited), "when <asset-class> enters <location of interest> after exiting <location of interest> apply <action>" (e.g., used to enforce a virus-scanning/cleaning regime to clean a device of corruptions commonly arising at the location of interest being exited, and/or to which the location of interest being entered is particularly susceptible), and/or "when <asset-class> enters <location of interest> after entering <location of interest> apply <action>" (e.g., used when entering a particular location of interest by way of another, larger location of interest within which the particular location of interest is contained). Other variations and/or modifications are possible.

Figure 6:
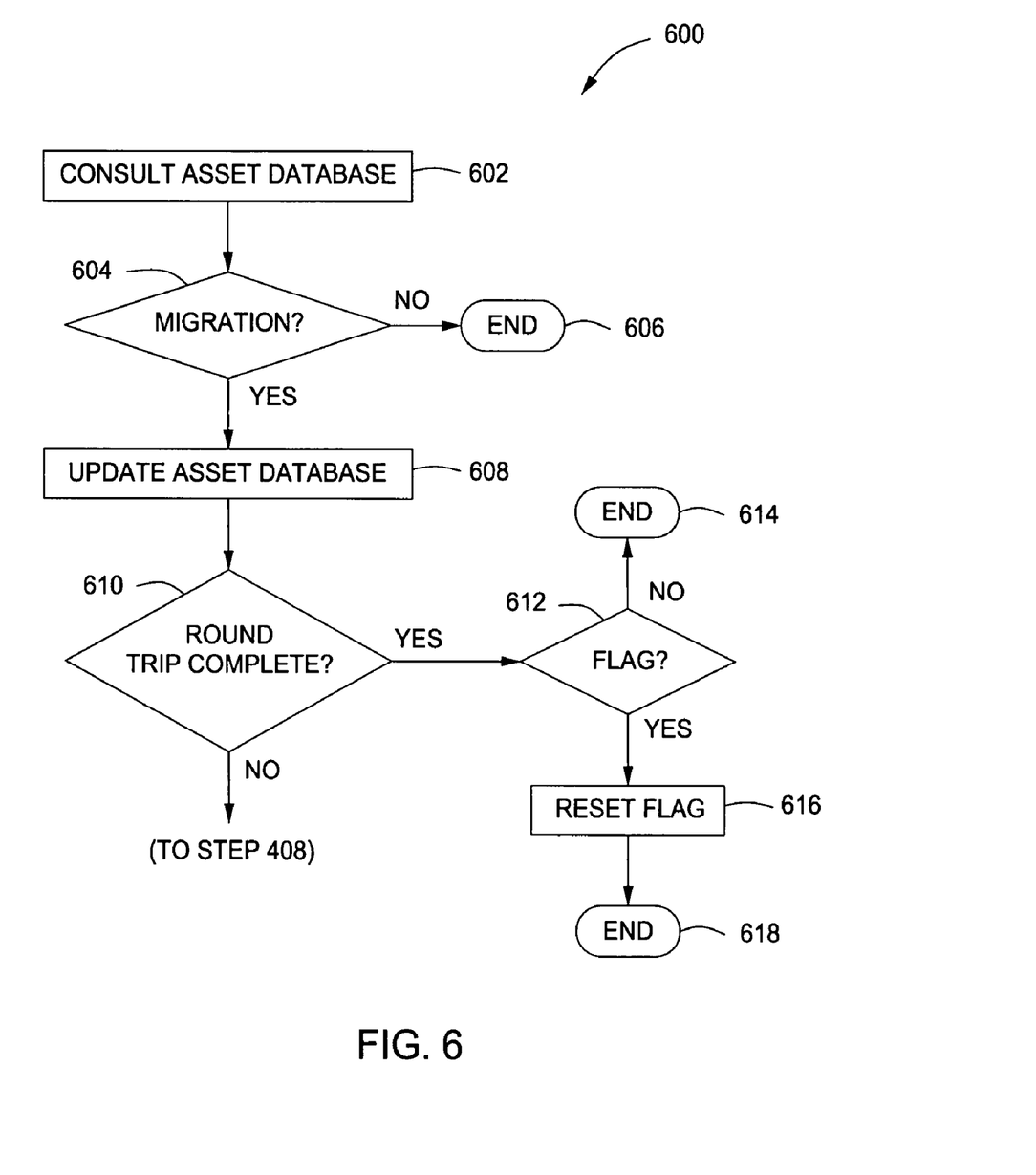
FIG. 6 is a flow diagram depicting an exemplary embodiment of a method for implementing a migration determination step shown and described with reference to FIG. 4 in accordance with one or more aspects of the invention.

FIG. 6 is a flow diagram depicting a method 600 for implementing the migration determination step 406 shown and described herein with respect to FIG. 4 in accordance with one or more aspects of the invention. Accordingly, the method 600 may be performed by the change administration service 250 of FIG. 2 and the change administration server 126 of FIG. 1. The method 600 begins at a step 602 at which the asset database 132 is consulted using the device identification information with which the device 122 is uniquely associated to determine: 1) at which location of interest within the parent enterprise 102 the device 122 was last present; and 2) at which location of interest within the parent enterprise 102 the configuration settings of the device 122 were last changed. The asset class information with which the device 122 is associated (the use of which is discussed above with reference to the flow diagram depicted in FIG. 5) may also be determined via the asset database consultation performed at the step 602. Alternatively, such information can be conveyed by the RFID transponder 124 associated with the device 122 in response to the RFID interrogation signal transmitted by the device detector 114, 118.

At a step 604, a determination is made whether the presence of the device 122 at the particular location of interest 116, 120 evidences a migration of the device 122 from another location of interest. If not, the method 600 proceeds to a step 606, at which the method 600 ends. If so, the method 600 proceeds to a step 608, at which the asset database is updated to reflect the presence of the device 122 at a new location of interest. At a step 610, a determination is made whether the presence of the device 122 at the particular location of interest 116, 120 evidences a return on the part of the device 122 to the last location of interest at which its configuration settings were changed (e.g., the device 122 has moved at least twice, resulting in a 'round trip' during which, for whatever reason, the device 122 was never actually connected to the parent enterprise 102 at any of the new locations of interest). If so, the method 600 proceeds to a step 612, where a determination is made whether a flag has previously been set to signify a pending change to the configuration settings of the device 122. If not, the method 600 proceeds to a step 614, at which the method 600 ends. If so, the method 600 proceeds to a step 616, at which such flag is reset or eliminated as having been superseded by subsequent events. The method 600 then ends at a step 618. Returning now to the step 610, if a negative result is obtained thereat (e.g., no evidence of a 'round trip'), the method 400 of FIG. 4 resumes with the step 408.

Figure 7:
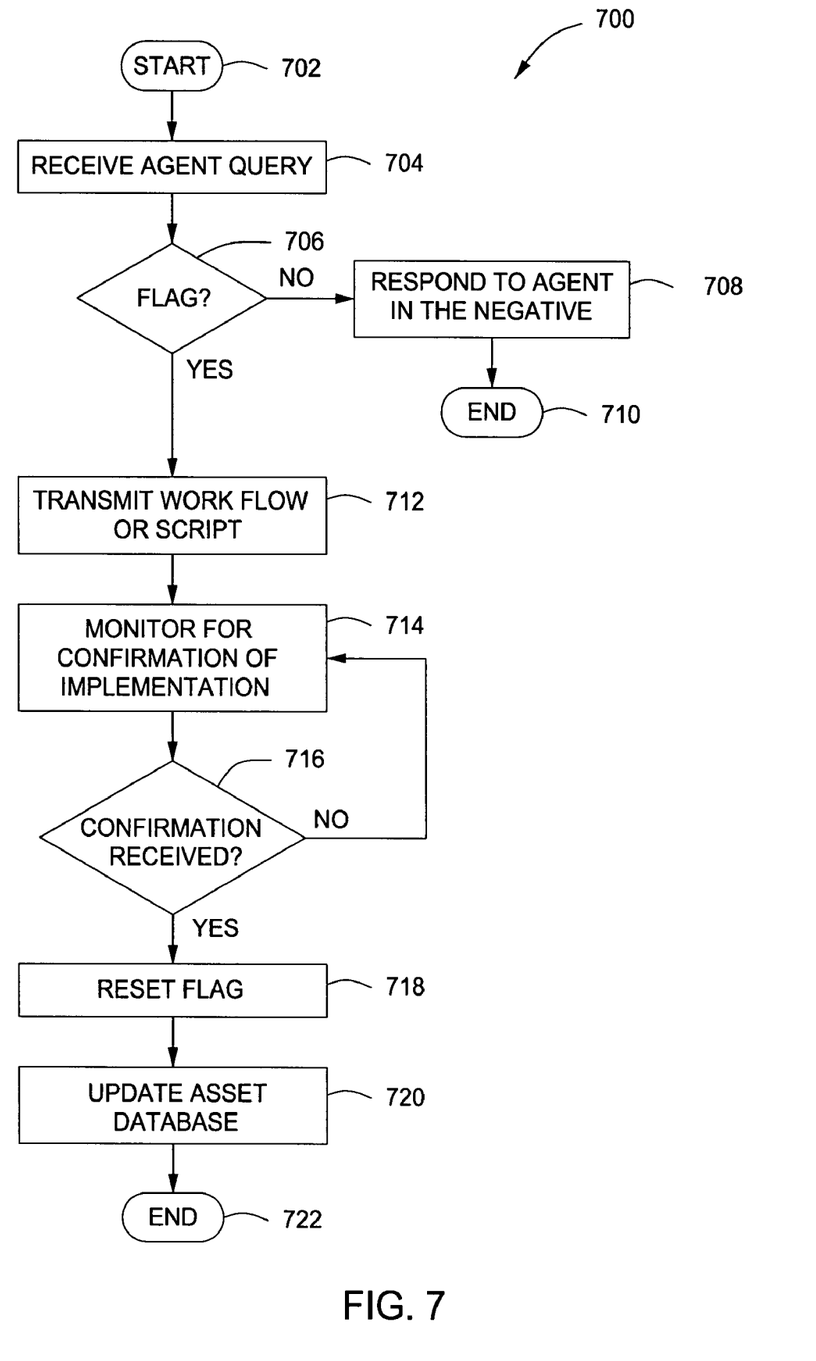
FIG. 7 is a flow diagram depicting an exemplary embodiment of a method for initiating an implementation of changes to the configuration settings of mobile client devices in accordance with one or more aspects of the invention.

FIG. 7 is a flow diagram depicting an exemplary embodiment of a method 700 for initiating, in accordance with one or more aspects of the invention, an implementation of changes to the configuration settings of mobile client devices previously determined to be necessary. The method 700 may be performed by the change administration service 250 of FIG. 2 and the change administration server 126 of FIG. 1 to initiate such changes with respect to such devices as the device 122 of FIG. 1 as the same move between locations As alluded to above, and as discussed more fully below, the method 700 may be used and/or altered to administer changes to mobile client devices other than, or in addition to, the configuration settings thereof.

The method 700 begins at a step 702, and proceeds to a step 704, at which a query is received from the change implementation agent 360 of the device 122. The change implementation agent 360 generates the query upon an occurrence of the device 122 attempting to establish a communication with the parent enterprise 102 at the particular location of interest 116, 120. Such query relates to whether or not a flag exists to indicate a pending required change to the configuration settings of the device 122. Proceeding to a step 706, a determination is made whether such a flag exists. If not, the method 700 proceeds to a step 708, at which is transmitted a negative response to the change implementation agent 360. The method 700 proceeds from step 708 to step 710, at which the method 700 ends. If at step 706 the flag does exist, the method 700 proceeds to a step 712, at which an affirmative response is sent to the change implementation agent 360 that includes a corresponding work flow or script. The work flow or script is executable by the change implementation agent 360 to implement the required change to the configuration settings of the device 122.

At step 714, monitored for is a confirmation from the change implementation agent 360 that the required change to the configuration settings of the device 122 has been implemented. Proceeding to a step 716, a determination is made whether such a confirmation has been received. If not, the method returns to the step 714, and such monitoring is resumed. If so, the method 700 proceeds to a step 716, at which the flag corresponding to the required change is reset or otherwise removed. At step 718, the asset database 132 is updated to reflect the implementation of the change to the configuration settings of the device 122. For example, a value of the previous location of interest in the particular database entry 134 of the asset database 132 corresponding to the particular device 122 can be updated to correspond to the identity of the particular location of interest 116, 120 at which the configuration settings of the device 122 were just changed. At a step 722, the method 700 ends.

The method 700 is susceptible to many useful variations and/or modifications. In at least some embodiments, the transmission of the corresponding work flow or script is triggered by means other than by the change implementation agent 360 querying the change administration service 250 as to the existence of a related flag. For example, such transmission can be triggered manually via a user-selectable query or command function.

Figure 8:
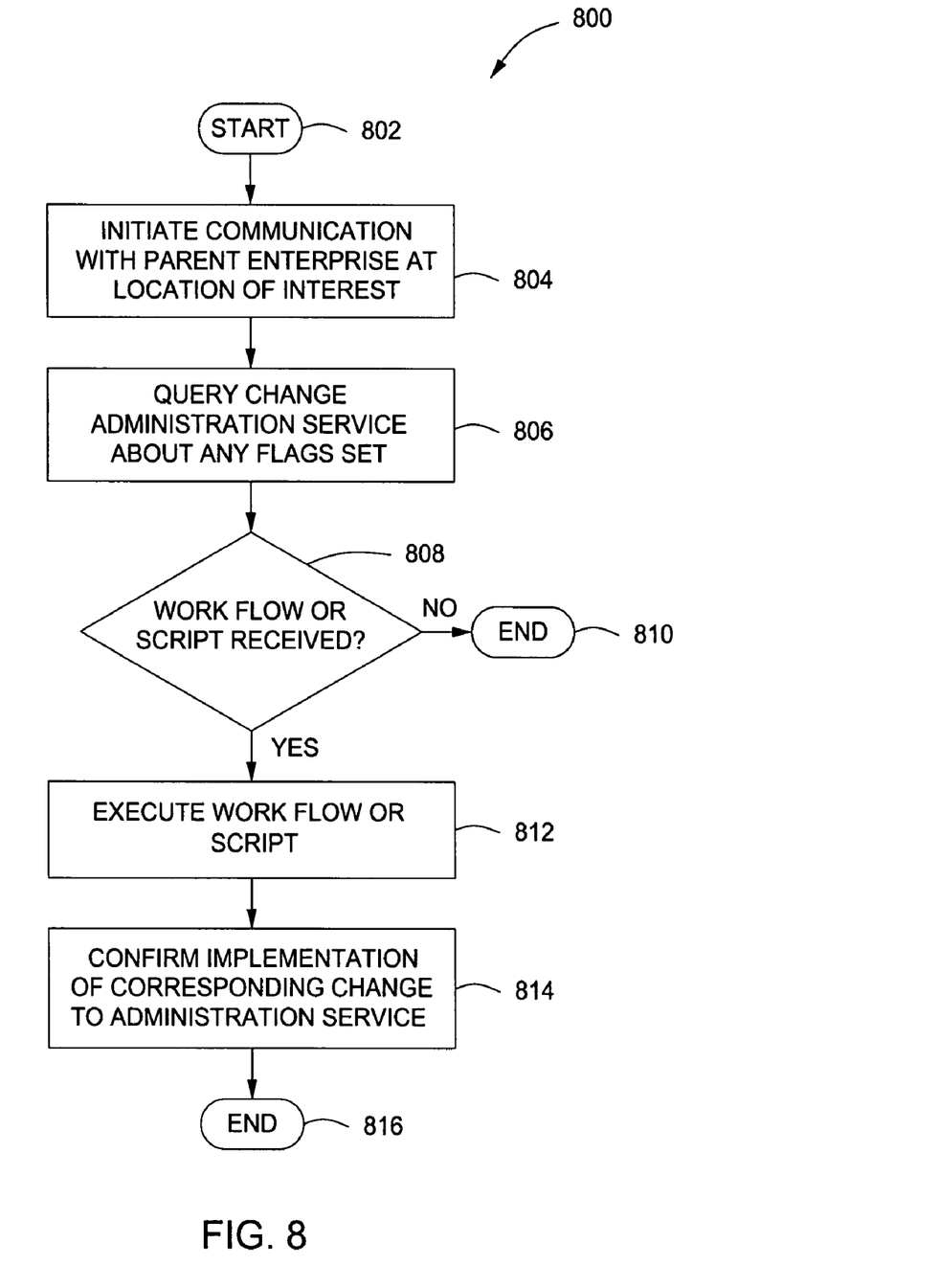
FIG. 8 is a flow diagram depicting an exemplary embodiment of a method for implementing changes to the configuration settings of a mobile client device in accordance with one or more aspects of the invention.

FIG. 8 is a flow diagram depicting an exemplary embodiment of a method 800 for implementing, in accordance with one or more aspects of the invention, changes to the configuration settings of a mobile client device previously determined to be necessary. The method 800 may be performed by the change implementation agent 360 of FIG. 3 and the device 122 of FIG. 1 after the same has moved between locations. As alluded to above, and as discussed more fully below, the method 800 may be used and/or altered to implement changes to a mobile client device other than, or in addition to, the configuration settings thereof.

The method 800 begins at a step 802, and proceeds to a step 804, at which the device 122 initiates a connection to the parent enterprise 102 at the particular location of interest 116, 120. Proceeding now to a step 806, the change implementation agent 360 queries the change administration service 250 as to whether any flags are set to indicate that a required change to the configuration settings of the device 122 is pending. Proceeding now to a step 808, a determination is made whether a work flow or script has been received in response to the query of step 806. If not, the method 800 ends at a step 810. If so, the method 800 proceeds to a step 812, at which change implementation agent 360 executes the work flow or script received in response to the query of step 806. The method 800 then proceeds to a step 814, at which the change implementation agent 360 confirms to the change administration service 250 the fact of the required change to the configuration settings of the device 122 having been implemented. At a step 816, the method 800 ends.

The method 800 is susceptible to many useful variations and/or modifications. The execution of the required changes to the configuration settings of the device may include one or more instances of a user-controlled option for forgoing one or more portions of the required change. For example, one or more portions thereof may not be necessarily required for proper operation of the device at the particular location of interest 116, 120, but rather are considered suggested or optional changes. In such circumstances, the confirmation sent by the change implementation agent 360 in step 814 may confirm such portions of the required change as were actually implemented, and/or may indicate such portions thereof that were foregone by choice of the mobile employee user. Other variations and/or modifications are possible.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While, for the purposes of disclosure there have been shown and described what are considered at present to be illustrative, example embodiments of the present invention; it will be appreciated by those skilled in the art that other uses can be resorted to and changes can be made to the example embodiment details or characteristics without departing from the spirit and scope of the invention. The fact that any illustrative list is present in this disclosure does not intend a limitation on the present invention to those items listed. It is therefore desired that the invention not be limited to these embodiments and it is intended that the appended claims cover all such modifications as fall within this spirit and scope.

While the foregoing is directed to embodiments of the present invention, other and further embodiments of the invention can be devised without departing from the basic scope thereof, and the scope thereof is determined by the claims that follow.

The invention claimed is:

1. A method of administering a mobile client device, comprising:
   receiving notice of a device being physically present at a location of interest;
   preparing, in response to the physical presence notice, an executable work flow or script for implementing a corresponding change to the device; and
   transmitting, upon an occurrence of the device initiating a communication with a network at the location of interest, the executable work flow or script to the device so as to enable an agent resident on the device to implement the corresponding change.

2. The method of claim 1, wherein the step of receiving notice includes receiving a detection signal generated and transmitted by a device detector located at the location of interest in response to the device becoming within a sufficiently close proximity to the device detector to permit the device detector to directly detect the device.

3. The method of claim 2, wherein the direct detection of the device includes the device detector remotely receiving a response signal from a vicinity of the device, the response signal being generated and transmitted in response to a corresponding interrogation signal.

4. The method of claim 3, wherein the interrogation signal is an RFID interrogation signal, an RFID transponder resident on or in the device generates and transmits the response signal, and the device detector is an RFID reader.

5. The method of claim 1, wherein the step of preparing occurs prior to the occurrence of the device initiating a communication with the parent enterprise.

6. The method of claim 1, wherein the step of receiving notice includes receiving, via the detection signal, a device identification information with which the device is uniquely associated, and wherein the method further comprises updating an asset database to reflect the physical presence of the device at the location of interest.

7. The method of claim 1, wherein the step of receiving notice includes receiving, via the detection signal, an asset class information with which the device is associated, and the step of preparing includes consulting a rule database using the asset class information to obtain the executable work flow or script.

8. The method of claim 1, wherein the step of receiving notice includes receiving, via the detection signal, a location of interest identification information with which the location of interest is uniquely associated, and the step of preparing includes consulting a rule database using the location of interest identification information to generate the executable work flow or script.

9. The method of claim 1, wherein the corresponding change to the device includes a change to at least one of the following configuration settings of the device: a time zone setting, a proxy server setting, a dynamic host configuration protocol (DHCP) server setting, a locally-available network printers setting, a security/virtual private network (VPN) setting, a preferred file and backup servers setting, a mail server setting, or a short message service (SMS) messaging center setting.

10. The method of claim 1, wherein the corresponding change to the device includes at least one of enabling or disabling an application resident on the device.

11. The method of claim 1, wherein the corresponding change to the device includes at least one of adding thereto or removing therefrom one or more tools, one or more utilities, or one or more data files.

12. The method of claim 1, wherein the step of preparing includes selectively setting a flag, such that an agent resident on the device is permitted, upon the occurrence of the device initiating a communication with the network at the location of interest, to query whether such a flag exists, and such that the executable work flow or script is transmitted to the device in response to the query.

13. The method of claim 1, wherein the executable work flow or script is adapted to permit a user of the device to preclude a portion of the corresponding change from being implemented by the agent resident on the device.

14. The method of claim 1, further comprising receiving notice of the corresponding change having been implemented.

15. The method of claim 14, further comprising updating an asset database so as to cause the same to reflect a current state of the data structure resident on the device.

16. Apparatus for administering enterprise assets, comprising:
   means for receiving notice of a device being physically present at a location of interest;
   means for preparing, in response to the physical presence notice, an executable work flow or script for implementing a corresponding change to the device; and
   means for transmitting, upon an occurrence of the device initiating a communication with a network at the location of interest, the executable work flow or script to the device so as to enable an agent resident on the device to implement the corresponding change.

17. The apparatus of claim 16, further comprising updating means for updating, in response to notice of the corresponding change having been implemented, an asset database to reflect a current state of the device.

18. The apparatus of claim 16, further comprising a rule database, the rule database being consultable using an asset class information with which the device is associated to generate the executable work flow or script.

19. A system for administering mobile client devices, including:
   a device detector at a location of interest for directly detecting a presence of a device at the location of interest and for generating and transmitting a detection signal in response thereto; and
   an appliance coupled to the device detector for determining, in response to the detection signal, a corresponding change to the device, and for transmitting, upon an occurrence of the device initiating a communication with a network at the location of interest, an executable work flow or script to the device to enable an agent resident on the device to implement the corresponding change.

* * * * *